United States Patent
Wang

(10) Patent No.: US 7,471,628 B2
(45) Date of Patent: Dec. 30, 2008

(54) INTELLIGENT FLOW CONTROL MANAGEMENT TO EXTEND FIBRE CHANNEL LINK FULL PERFORMANCE RANGE

(75) Inventor: Yanfeng Wang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 894 days.

(21) Appl. No.: 10/166,213

(22) Filed: Jun. 10, 2002

(65) Prior Publication Data
US 2003/0227874 A1 Dec. 11, 2003

(51) Int. Cl.
H04J 1/16 (2006.01)
H04L 12/28 (2006.01)
G06F 15/16 (2006.01)

(52) U.S. Cl. ............... 370/231; 370/235; 370/412; 709/232

(58) Field of Classification Search ......... 370/229–231, 370/235, 230.1, 236–236.1, 389, 392, 465, 370/412; 709/232
See application file for complete search history.

(56) References Cited

U.S. PATENT DOCUMENTS

| | | | |
|---|---|---|---|
| 5,453,982 A * | 9/1995 | Pennington et al. | 370/235 |
| 5,528,591 A * | 6/1996 | Lauer | 370/231 |
| 5,610,745 A | 3/1997 | Bennett | 359/139 |
| 5,638,518 A | 6/1997 | Malladi | 395/200.21 |
| 6,393,489 B1 | 5/2002 | Sambamurthy et al. | 709/250 |
| 6,925,058 B2 * | 8/2005 | Jones et al. | 370/235 |
| 7,031,258 B1 * | 4/2006 | Frisch et al. | 370/235 |
| 2003/0016683 A1 | 1/2003 | George et al. | 370/404 |
| 2003/0063564 A1* | 4/2003 | Ha et al. | 370/230 |
| 2003/0091037 A1 | 5/2003 | Latif et al. | 370/355 |

FOREIGN PATENT DOCUMENTS

WO WO 01/43328 6/2001

OTHER PUBLICATIONS

"Fibre Channel Framing and Signaling (FC-FS), Rev. 1.70", NCITS Working Draft Proposed American National Standard for Information Technology, Feb. 8, 2002.
International Search Report 2003.

* cited by examiner

Primary Examiner—Firmin Backer
Assistant Examiner—Nittaya Juntima
(74) Attorney, Agent, or Firm—Cindy Kaplan

(57) ABSTRACT

Supplemental flow control mechanisms are provided to facilitate efficient data exchange between Fibre Channel ports over extended distances. In one implementation, a supplemental buffer mechanism is maintained and managed in part by substituting a locally generated ready indication signal for the remotely generated ready indication signal provided by the Fibre Channel standard. In this way, data flow may be adjusted optimally irrespective of the relatively long propagation time of the ready signals exchanged by the two sides of the link.

18 Claims, 6 Drawing Sheets

INTELLIGENT FLOW CONTROL MANAGEMENT TO EXTEND FIBRE CHANNEL LINK FULL PERFORMANCE RANGE

BACKGROUND OF THE INVENTION

The present invention relates to data networking and more particularly to systems and methods for flow control.

The Fibre Channel standard defines a bi-directional link protocol commonly used to connect computers to disk drives and other peripherals. A typical Fibre Channel link may have a bandwidth of 1063 Mbps and a span of up to 10 kilometers.

One typical application of Fibre Channel is interconnecting computer CPUs with arrays of disk drives in large scale computing centers, as would be used in, e.g., financial transaction processing. For reasons of fault tolerance, it is desirable to locate redundant storage resources at remote locations. The advent of high data rate metropolitan optical networks makes it possible to implement so-called storage area networks (SANs) that span over a much longer distance than 10 kilometers.

It would be preferable to apply the widely prevalent Fibre Channel standard to communication across SANs and therefore minimize the need to redesign computing center equipment. A problem arises, however, in that most Fibre Channel devices available now assume link distances no more than 10 kilometers while it is desirable to locate SAN nodes much further apart, e.g., hundreds of kilometers.

The Fibre Channel standard defines a flow control scheme that maximizes data throughput while preventing the transmitter from sending more data than the receiver is currently able to process. For the most prevalent classes of Fibre Channel devices, the standard utilizes a buffer-to-buffer credit management scheme. When a link is set up, the two ends exchange information about the size of their receiver buffers. A Fibre Channel receiver port sends a ready signal indication after each received frame but only if there is sufficient buffer space to accommodate the largest possible frame of new data. The transmit port counterpart uses the ready signal indication and its knowledge of the receiver port's buffer size to determine whether or not to transmit a frame. This scheme works well over relatively short distances but breaks down over larger distances because of the long delay between sending a frame and receiving a ready indication in response.

What is needed are systems and methods for managing flow control in Fibre Channel links that may extend over large distances.

SUMMARY OF THE INVENTION

By virtue of one embodiment of the present invention, supplemental flow control mechanisms are provided to facilitate efficient data exchange between Fibre Channel ports over extended distances. In one implementation, a supplemental buffer mechanism is maintained and managed in part by substituting a locally generated ready indication signal for the remotely generated ready indication signal provided by the Fibre Channel standard. In this way, data flow may be adjusted optimally irrespective of the relatively long propagation time of the ready signals exchanged by the two sides of the link.

A first aspect of the present invention provides a method for operating a transport interface to a local Fibre Channel port to manage flow control. The method includes: receiving a frame for transmission to a remote Fibre Channel port and locally issuing a shadow receiver ready signal indication to said local Fibre Channel port to permit further data transmission from said local Fibre Channel port to said remote Fibre Channel port.

A second aspect of the present invention provides apparatus for operating a transport interface between a local Fibre Channel interface and a link to a remote Fibre Channel interface. The apparatus includes: an ingress/egress block that issues a shadow receiver ready indication to said local Fibre Channel interface to regulate flow based on remote buffer availability and a supplemental buffer that buffers data received from said remote Fibre Channel interface to allow continued data transmission prior to remote receipt of a receive ready signal indication from said local Fibre Channel port.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application where a Fibre Channel link is tunneled through a transport network (TN). In one particular implementation, the transport network is implemented as a metropolitan optical network. Fibre Channel frames are transported through the network encapsulated within packets, such as Ethernet packets. Optical network details are not germane to the description of the present invention but it will be appreciated that the Ethernet packets may be carried on optical signals modulated with e.g., 2.5 Gbps or 10 Gpbs data waveforms. Multiple optical signals also may share the same fiber by use of wavelength division multiplexing (WDM) techniques.

Figure 1:
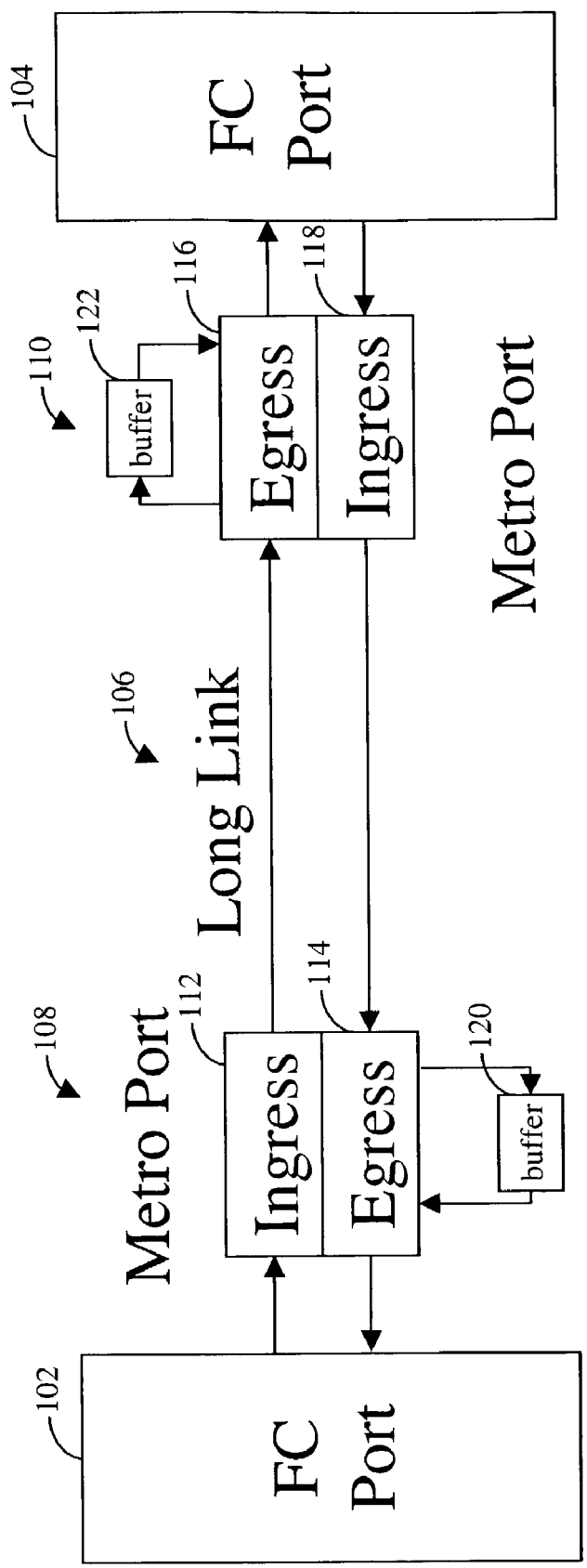
FIG. 1 depicts an enhanced Fibre Channel link according to one embodiment of the present invention.

FIG. 1 depicts a Fibre Channel link that is carried through a metropolitan network by use of Ethernet transport interfaces according to one embodiment of the present invention. Two Fibre Channel ports 102 and 104 exchange data in accordance with the Fibre Channel standard as described in, e.g., "Fibre Channel Framing and Signaling (FCFS), Rev 1.70," NCITS Working Draft Proposed American National Standard for Information Technology, Feb. 8, 2002, the contents of which are herein incorporated by reference in their entirety. Fibre Channel ports 102 and 104 may provide connectivity to devices such as, e.g., disk drives, disk storage arrays, magnetic tape drives, processing units, printers, etc.

A bi-directional link 106 interconnects the Fibre Channel ports, carrying the Fibre Channel frames encapsulated within Ethernet packets. The link 106 can be either an actual physical link or a tunnel through a network cloud. Metro ports 108 and 110 interface Fibre Channel ports 102 and 104 to the metro-optical network. Metro port 108 includes an ingress block 112 to encapsulate frames to be transmitted and an egress block 114 to deencapsulate Fibre Channel frames from received packets. Similarly, metro port 110 includes an ingress block 116 and an egress block 118.

According to one embodiment of the present invention, metro ports 108 and 110, in addition to encapsulating and deencapsulating Fibre Channel frames, also operate a supplemental flow control mechanism to optimize throughput over longer distances. In support of the supplemental flow control mechanism, metro ports 108 and 110 operate supplemental buffers 120 and 122, respectively. In addition to providing supplemental buffer capacity, metro ports 108 and 110 substitute locally generated receiver ready indications for the remotely generated ones. Remotely generated receiver ready indications are deleted from received frames. (It is understood that "local" in this context refers to the connection between a metro port and its associated Fibre Channel port rather than any specific distance while "remote" refers to the other end of the link.) This scheme overcomes the throughput drop caused by the long delay in receiving the remotely generated ready indication. Optimal throughput is provided while assuring that the supplemental buffers and the buffers internal to the Fiber Channel ports are not overrun.

Before describing the supplemental flow control mechanism in greater detail, it will be useful to define certain parameters:

M_SIZE: the maximum frame size.

F_SIZE: the frame size of a particular Fibre Channel frame being processed.

BB_CREDIT: the "credit number" of a Fibre Channel port, the number of consecutive frames that may be sent to that port in sequence without overrunning the port's internal buffer. The metro port learns the BB_CREDIT value of its local Fibre Channel port by monitoring the "login" frame used in establishing the Fibre Channel link.

BB_CREDIT_CNT: a variable maintained by each metro port to track the number of unacknowledged frames that have been sent to the local Fibre Channel port. The initial value is zero.

TOTAL_BUF_SIZE: the total buffer size of a metro port's attached buffer.

L_FREE_BUF_SIZE: a variable maintained by a metro port to count free buffer size in its attached buffer. This value is initialized to TOTAL BUF_SIZE BB_CREDIT*M_SIZE.

R_FREE_BUF_SIZE: a variable maintained by a metro port to count free buffer available at the remote metro port. Initialized to zero.

NEW_BUF_FREED: a value, described below, carried in the encapsulation header of an Ethernet packet carrying a Fibre Channel frame between the two metro ports.

R_RDY_DEBT: a variable maintained by a metro port to count the number of Fibre Channel frames that have been received from the local Fibre Channel port but for which no ready indication response has been sent.

Figure 2:
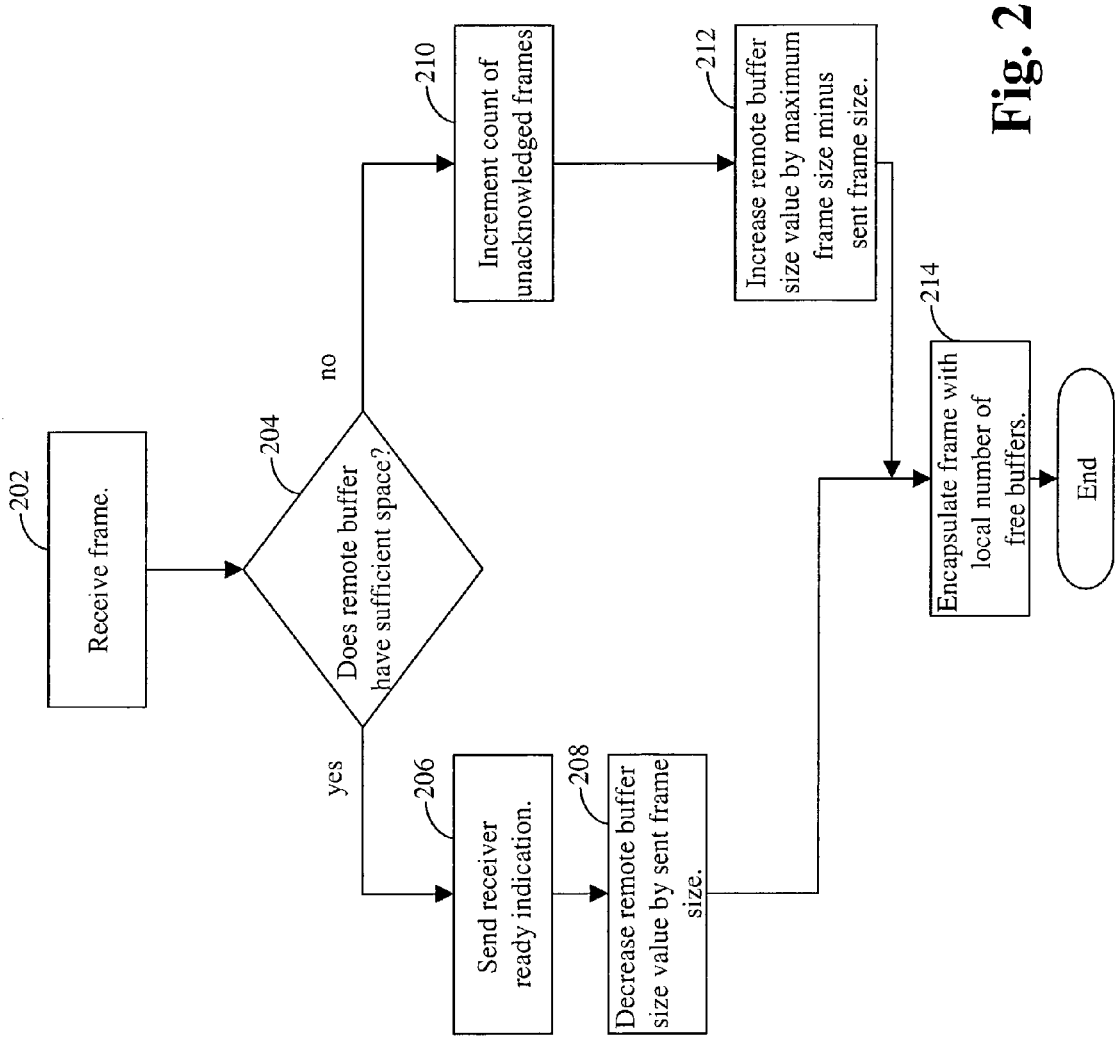
FIG. 2 depicts steps of operating a metropolitan port in handling a Fibre Channel frame to be transmitted to a remote site according to one embodiment of the present invention.
Figure 3:
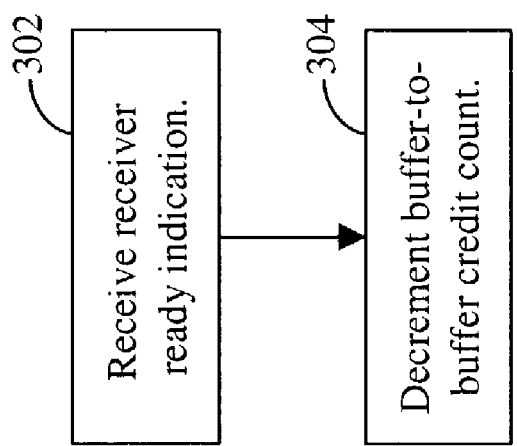
FIG. 3 depicts steps of operating a metropolitan port in receiving a receiver ready indication according to one embodiment of the present invention.
Figure 4:
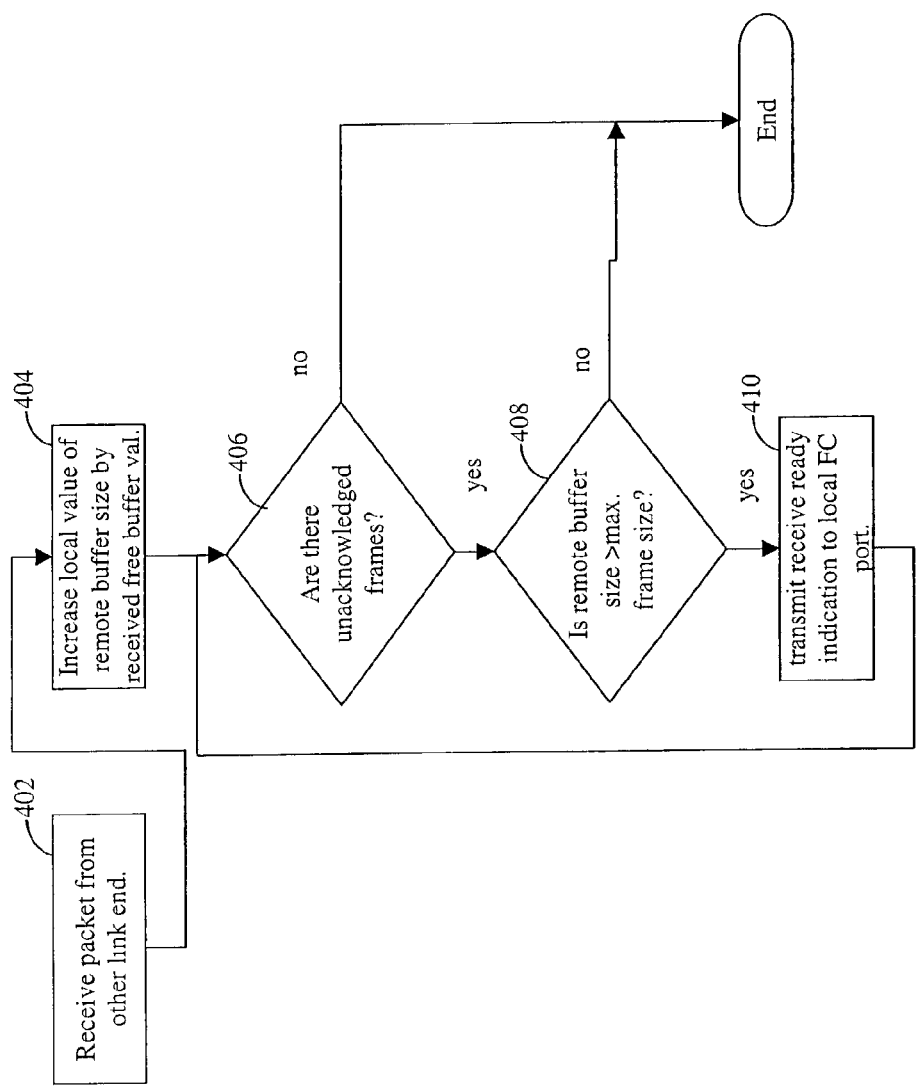
FIG. 4 depicts steps of operating a metropolitan port in handling a frame received from the remote end of the link according to one embodiment of the present invention.
Figure 5:
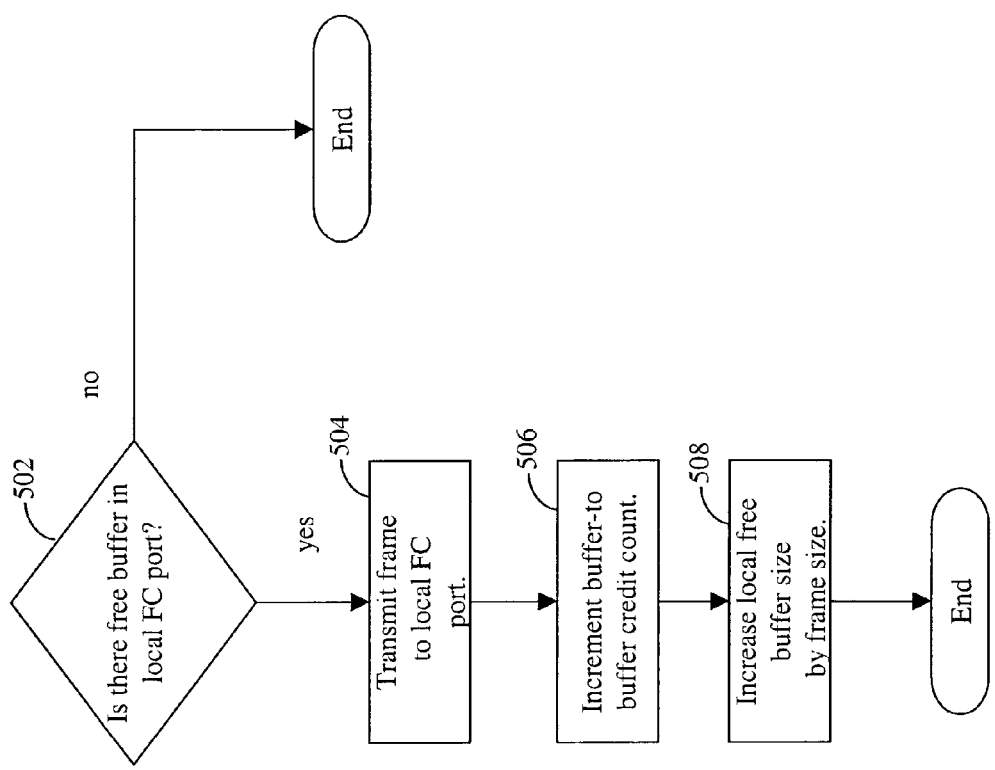
FIG. 5 depicts steps of operating a metropolitan port in forwarding a frame received from the remote link end to the local Fibre Channel port.

Detailed flow control operation of the metro ports will now be explained with reference to FIGS. 2-5. FIGS. 2-3 depict the ingress block operation of each metro port while FIGS. 4-5 depict the egress block operation.

FIG. 2 depicts steps of operating a metro port ingress block in handling a packet received from the local port according to one embodiment of the present invention. At step 202, the metro port ingress block receives a Fibre Channel frame from its attached local Fibre Channel port. At step 204, the ingress block tests whether R_FREE_BUF_SIZE is greater than or equal to F_SIZE, indicating the availability of buffer space at the remote metro port. If R_FREE_BUF_SIZE is greater than or equal to F_SIZE, then processing proceeds to step 206 where a locally generated ready indication (R_RDY in Fibre Channel terminology) is sent through the egress block to the local Fibre Channel port. Then, at step 208, R_FREE_BUF_SIZE is decremented by F_SIZE to account for the frame to be transmitted to the remote metro port.

If step 204 finds that R_FREE_BUF_SIZE is less than F_SIZE, then processing proceeds to step 210 where R_RDY_DEBT is incremented, indicating that a frame has been received from the local Fibre Channel Port but no R_RDY has been sent back in exchange. Then at step 212, R_FREE_BUF_SIZE is incremented by M_SIZE-F_SIZE. The increase by M_SIZE is because BB_CREDIT*M_SIZE of buffer space was reserved initially. Therefore, for each unacknowledged frame, the flow control mechanism can release M_SIZE of buffer space. At step 214, the Fibre Channel frame is encapsulated with a header including a value of NEW_BUF_FREED that has been set to L_FREE_BUFF_SIZE. L_FREE_BUFF_SIZE is then reset to zero. The encapsulated frame is sent to the remote end of the link. If no frame has been received from the local Fibre Channel port for a predetermined time, e.g., a time equivalent to the time necessary to receive 2 to 8 consecutive maximum size frames, then step 214 is performed anyway, encapsulating and transmitting an empty frame for the purpose of sending the header information.

FIG. 3 depicts steps of operating a metro port ingress block in handling a receive ready indication (R_RDY) received from the local Fibre Channel port. At step 302, R_RDY is received from the local Fibre Channel port indicating readiness for new data. Rather than being relayed to the remote Fibre Channel port, the R_RDY simply causes the metro port to decrement the value of BB_CREDIT_CNT by one at step 304 to locally account for the local Fibre Channel port's indicated receptiveness to new data.

FIG. 4 depicts steps of operating a metro port egress block to handle a packet received via the link. In particular, FIG. 4 pertains to steps prior to release from the local buffer. At step 402, the egress block receives an encapsulation packet from the remote metro port. The value NEW_BUF_FREED is extracted from the encapsulation header and the FC frame (if non-empty) is locally buffered. At step 404, R_FREE_BUF_SIZE is incremented by NEW_BUF_FREED. A step 406 tests whether R_RDY_DEBT is greater than zero indicating unacknowledged frames. If R_RDY_DEBT is not greater than zero, the process terminates. If R_RDY_DEBT is greater than zero, then processing proceeds to step 408 which tests if R_FREE_BUF_SIZE is greater than or equal to the maximum frame size, M SIZE. If R_FREE_BUF_SIZE is not greater than or equal to M_SIZE, the process terminates. If R_FREE_BUF_SIZE is greater than or equal to M_SIZE then the process moves on to step 410. At step 410, a locally generated R_RDY is sent to the local Fibre Channel port, the value of R_RDY_DEBY is decremented by one, and the value of R_FREE_BUF_SIZE is decremented by M_SIZE. After step 410, processing returns to step 406. Thus the ready indication is generated depending on remote buffer availability and whether ready indications are "owed" to the local Fibre Channel port based on the port's earlier transmissions.

FIG. 5 depicts steps of operating the metro port egress block to transfer frames from the local buffer to the local Fibre Channel port. The steps of FIG. 5 are performed periodically when the local buffer is non-empty. A step 502 determines if there is free buffer within the local Fibre Channel port by comparing BB_CREDIT_CNT to BB_CREDIT. If there is no free buffer space there (BB_CREDIT_CNT greater than or equal to BB_CREDIT), the process terminates. If BB_CREDIT_CNT is less than BB_CREDIT, then processing proceeds to step 504. At step 504, a frame is dequeued from the metro port's buffer and sent to the local Fibre Channel port. Also, the BB_CREDIT_CNT value is incremented and the value of L_FREE_BUF_SIZE is increased by F SIZE, the size of the just-dequeued frame.

The flow control mechanism process described above provides maximum throughput while guaranteeing no buffer overflow. Unlike the original Fibre Channel flow control mechanism, the actual frame size is used in managing the metro port buffers, making for more efficient use of available buffer space. Excellent performance has been found over a broad range of traffic patterns.

Network Device Details

Figure 6:
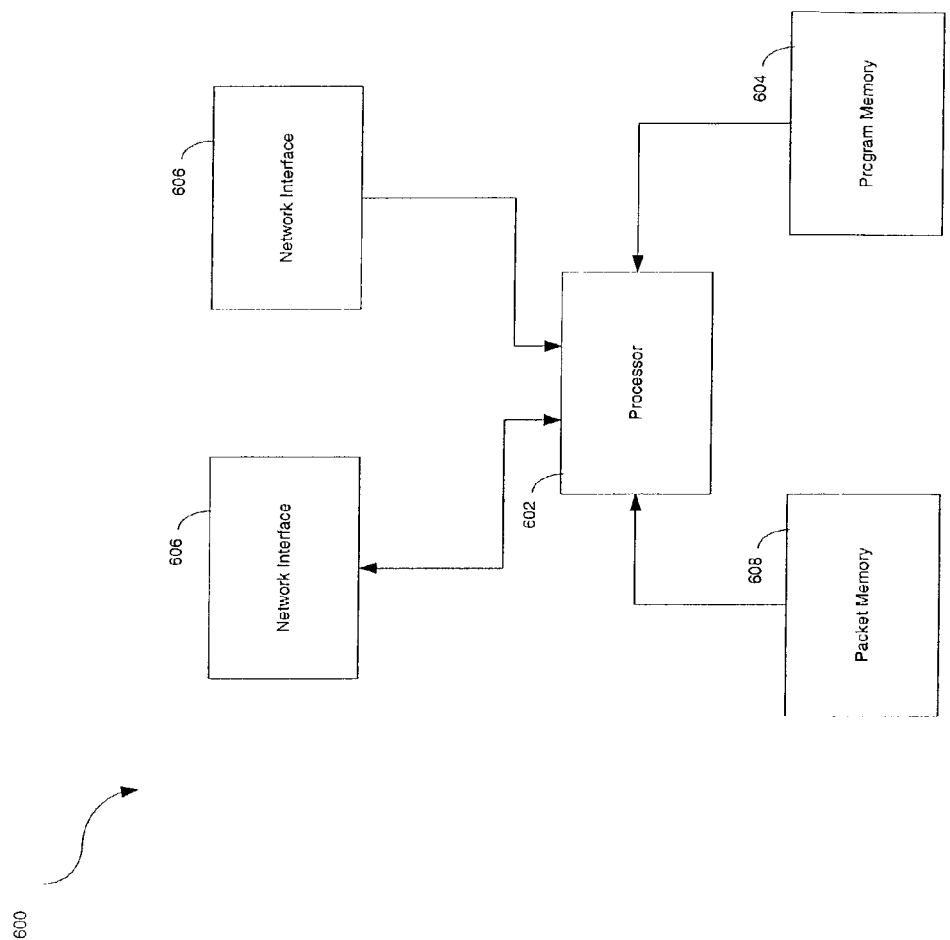
FIG. 6 depicts a network device according to one embodiment of the present invention.

FIG. 6 depicts a network device 600 that may be used to implement, e.g., the metro ports of FIG. 1 and/or perform any of the steps of FIGS. 2-5. In one embodiment, network device 600 is a programmable machine that may be implemented in hardware, software or any combination thereof. A processor 602 executes code stored in a program memory 604. Processor 602 may perform the encapsulation, deencapsulation, and flow control operations described above. Program memory 604 is one example of a computer-readable storage medium. Program memory 604 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is an example of a transmission medium.

Network device 600 interfaces with physical media via a plurality of network interfaces 606. For example, one of network interfaces 606 may couple to an optical fiber and may incorporate appropriate physical and link layer functionality. In one implementation, there may be a network interface for the bi-directional metropolitan optical Ethernet link and another network interface for connecting to the local Fibre Channel port. The optical Ethernet interface may be a Gigabit Ethernet interface, 10-Gigabit Ethernet interface, etc. As packets are received, processed, and forwarded by network device 600, they may be stored in a packet memory 608. Packet memory 608 may serve to implement buffers such as buffers 120 and 122. Network device 600 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The flowchart steps of FIGS. 2-5 may be omitted, rearranged, substituted, or supplemented within the scope of the present invention.

The invention claimed is:

1. A method for operating a transport interface to a local Fibre Channel port to manage flow control, said method comprising:
    tracking remote buffer availability based on data received indicating free buffer size at said remote buffer;
    receiving a frame for transmission to a remote Fibre Channel port;
    locally issuing a shadow receiver ready signal indication to said local Fibre Channel port to permit further data transmission from said local Fibre Channel port to said remote Fibre Channel port, wherein locally issuing said shadow receiver ready signal indication comprises issuing said shadow receiver ready indication only when there is sufficient space at said remote buffer for said received frame; and
    transmitting said frame to said remote Fibre Channel port, wherein transmitting comprises encapsulating said frame with a value identifying a free buffer size in a local supplemental buffer, said value configured for use by a remote transport interface in tracking availability of said local supplemental buffer.

2. The method of claim 1 further comprising: operating said local supplemental buffer to allow said remote Fibre Channel port to continue data transmission prior to remote receipt of a receive ready signal indication from said local Fibre Channel port.

3. The method of claim 1 further comprising receiving a receive ready signal from said local Fibre Channel port and decrementing a variable that tracks unacknowledged frames sent to said local Fibre Channel port.

4. The method of claim 1 wherein receive ready signals received from said local Fibre Channel port are not forwarded to said remote Fibre Channel port.

5. The method of claim 1 further comprising encapsulating an empty frame with said value and transmitting said frame to said remote Fibre Channel port.

6. The method of claim 1 wherein tracking remote buffer availability comprises receiving a variable initialized to a total buffer size of said remote buffer minus a value based on a maximum frame size.

7. The method of claim 1 wherein there is sufficient space at said remote buffer for said received frame if a remote free buffer size is greater than or equal to a size of said received frame.

8. The method of claim 1 further comprising reducing a remote buffer size by a size of said transmitted frame.

9. Apparatus for operating a transport interface between a local Fibre Channel interface and a link to a remote Fibre Channel interface, said apparatus comprising:
    an ingress/egress block configured to track remote buffer availability based on data received indicating free buffer size at said remote buffer and issue a shadow receiver ready indication to said local Fibre Channel interface to regulate flow based on said remote buffer availability, wherein said ingress/egress block issues said shadow receiver ready indication only when there is sufficient space at said remote buffer for a received frame; and
    a supplemental buffer that buffers data received from said remote Fibre Channel interface to allow continued data transmission prior to remote receipt of a receive ready signal indication from said local Fibre Channel interface;
    wherein said ingress/egress block is configured to receive a frame for transmission to said remote Fibre Channel interface and transmit said frame to said remote Fibre Channel interface encapsulated with a value identifying a free buffer size within said supplemental buffer, said value configured for use by a remote transport interface in tracking availability of said local supplemental buffer.

10. The apparatus of claim 9 wherein receive ready signals received from said local Fibre Channel are not forwarded to said remote Fibre Channel port.

11. The apparatus of claim 9 wherein said ingress/egress block is further configured to receive a receive ready signal from said local Fibre Channel port and decrement a variable that tracks unacknowledged frames sent to said local Fibre Channel port.

12. The apparatus of claim 9 wherein said value is initialized to a total buffer size of said local supplemental buffer minus a value based on a maximum frame size.

13. A computer-readable storage medium encoded with computer executable codes for operating a transport interface to a local Fibre Channel port to manage flow control, said computer executable codes comprising:
  code that tracks remotes buffer availability based on data received indicating free buffer size at said remote buffer:
  code that receives a frame for transmission to a remote Fibre Channel port;
  code that locally issues a shadow receiver ready signal indication to said local Fibre Channel port to permit further data transmission from said local Fibre Channel port to said remote Fibre Channel port, wherein code that locally issues said shadow receiver ready indication comprises code that issues said shadow receiver ready indication only when there is sufficient space at said remote buffer for said received frame;
  code that transmits said frame to said remote Fibre Channel port, wherein said code that transmits comprises code that encapsulates said frame with a value identifying a free buffer size in a local supplemental buffer, said value configured for use by a remote transport interface in tracking availability of said local supplemental buffer; and 14. The computer-readable storage medium of claim 10, wherein said computer executable codes further comprising:
  code that operates said local supplemental buffer to allow said remote Fibre Channel port to continue data transmission prior to remote receipt of a receive ready signal indication from said local Fibre Channel port.

15. Apparatus for operating a transport interface to a local Fibre Channel port to manage flow control, said apparatus comprising:
  means for tracking remote buffer availability based on data received indicating free buffer size at said remote buffer;
  means for receiving a frame for transmission to a remote Fibre Channel port;
  means for locally issuing a shadow receiver ready signal indication to said local Fibre Channel port to permit further data transmission from said local Fibre Channel port to said remote Fibre Channel port, wherein locally issuing said shadow receiver ready signal indication comprises issuing said shadow receiver ready indication only when there is remote buffer availability; and
  means for transmitting said frame to said remote Fibre Channel port, wherein means for transmitting comprises means for encapsulating said frame with a value identifying a free buffer size in a local supplemental buffer, said value configured for use by a remote transport interface in tracking availability of said local supplemental buffer.

16. The apparatus of claim 15 further comprising:
  means for operating said local supplemental buffer to allow said remote Fibre Channel port to continue data transmission prior to remote receipt of a receive ready signal indication from said local Fibre Channel port.

17. The apparatus of claim 15 further comprising means for receiving a receive ready signal from said local Fibre Channel port and decrementing a variable that tracks unacknowledged frames sent to said local Fibre Channel port.

18. The apparatus of claim 15 wherein receive ready signals received from said local Fibre Channel port are not forwarded to said remote Fibre Channel port.

* * * * *